Nov. 3, 1936.        L. A. HARRIS        2,059,519
BRAKE FOR FISHING REELS
Filed Sept. 23, 1935
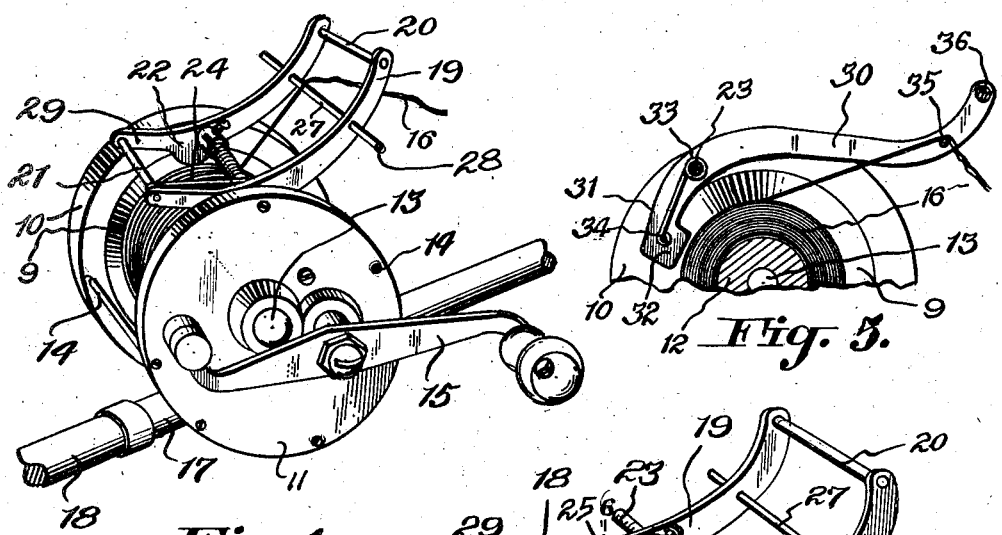
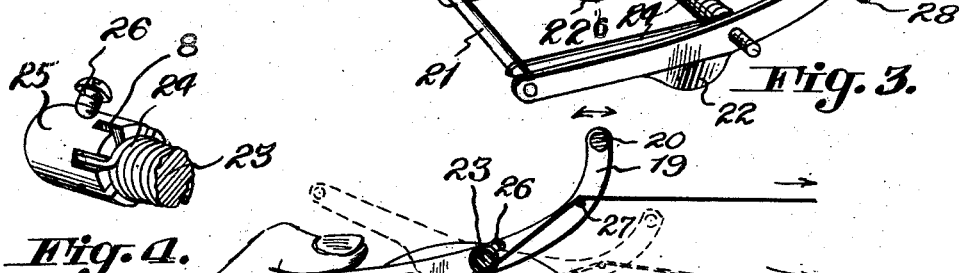
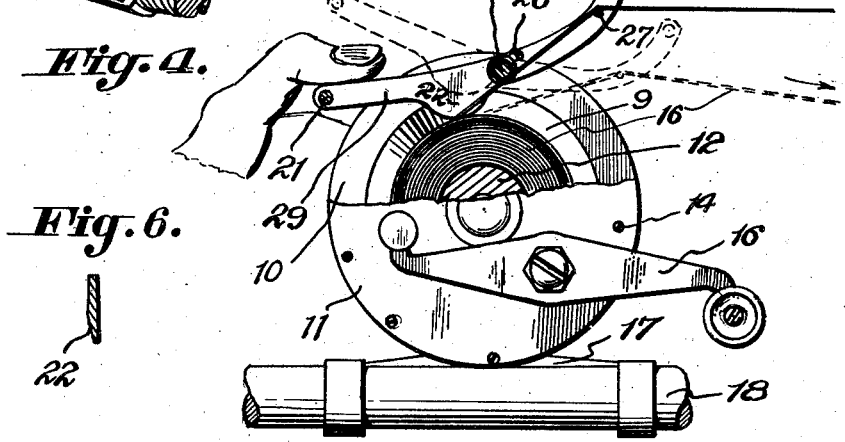
Inventor
Louis A. Harris
By Herman Jakobsson
Attorney Patented Nov. 3, 1936

2,059,519

UNITED STATES PATENT OFFICE 2,059,519

BRAKE FOR FISHING REELS

Louis A. Harris, Takoma Park, Md.

Application September 23, 1935, Serial No. 41,793

7 Claims. (Cl. 242—84.5)

My invention relates to a brake attachment for a line reel, and more particularly to a brake for a fishing reel.

This brake is suitable for attaching to practically all fishing reels of any make, large and small, but especially to those having star drag, free spool clutch or level winding attachment, or in other words, to all reels using sinkers.

One of its advantages is that, when playing the fish, pressure may be applied on the rear end of the rocker at its cross bar in order to produce desired friction or brake action thereby controlling the tension on the line.

Another advantage of my invention resides in the fact that back lashing is automatically prevented by the brake stopping the drum as soon as the pull on the line ceases or when the sinker hits the water or stops at the bottom, when the fisher throws the line.

The brake is provided with a spring tensioning device for the purpose of increasing or decreasing the line tension in proportion to the weight of the sinker.

When reeling in the line, the pull thereon from the fish, the sinker, or both will tilt the brake rocker thereby releasing the brake and allowing free reeling.

It is evident that the invention is applicable not only to fishing reels, but also to other kinds of drums, whether for reeling a line, a rope or a chain, and when in the claims the term "line" is used, this is intended to apply also to such other, similar, larger and smaller devices.

In the drawing my invention is illustrated as applied to a fishing reel.

Figure 1 is a perspective view of a fishing reel with my brake attachment;

Fig. 2 a side elevation and partial section of Fig. 1;

Fig. 3 a perspective view of the cradle or rocker alone;

Fig. 4 a detail, showing the manner of securing one end of the tensioning spring;

Fig. 5 shows a fragmentary section and side view of the reel with a modified form of the brake rocker, and Fig. 6 is a fragmentary section along line 6—6 of Fig. 3.

The same reference characters denote the same parts in all the figures.

The reel frame consists of the usual two end plates or disks 10 and 11 between which is mounted to revolve the spool or reel 12 on a central axle 13 secured in the two end disks 10 and 11. A certain number of cross rods 14 hold the structure together and a hand crank 15 is supplied for the line 16 on the reel 12. By means of a bracket 17 the device is adapted for securing on the fish rod 18.

The parts described so far are the usual ones of the fishing reel on the market and no improvement thereof is claimed by me.

My invention resides in a brake attachment for the reel consisting of four main parts, namely, the rocker or brake lever 18, a spindle 23 upon which the rocker is mounted, a bushing 25 and a spring 24 adapted to hold the rocker in braking position. The spindle 23 is secured in the two stationary side plates or disks 10, 11 and on the spindle 13 the rocker 18 is mounted to rock freely in both directions. This rocker consists of two double armed levers each with a forwardly extending arm 19, curved upwardly and a rearwardly extending arm 29. The two levers 19 are firmly held together by cross rods 20 and 21 at the front and rear ends respectively in such a manner that the width of the rocker is but slightly narrower than the width between the inner flat sides of the disks 10 and 11. Each of the rearward arms 29 has a downward projection or bump 22 situated near the fulcrum axis for the rocker at 23. The two bumps are alike and provided with bevelled surfaces on their outer sides adapted to engage the conical surfaces 9 on the side flanges of the reel 12. Thus when the rear end of the rocker 18 is pressed down the projections or bumps 22 come in contact with said conical surfaces 9 setting up sufficient friction therewith to brake the rotation of the reel and stop the unreeling of the line 16.

Beside the cross rods 20, 21 connecting the two sides or levers of the rocker 18, a cross pin 27 is also provided between the two forward arms 19, which pin 27 runs through said arms and extends on both sides of the rocker sufficiently far to form stops 28. These are intended to prevent further tilting forward of the rocker 18 upon pressure being exerted on the front end of the rocker when the ends 28 of the pin come in contact with the peripheral edge of the side plates or disks 10 and 11. The distance apart of the pin 27 and the cross rod 20 is such that the line can freely run out through the space between them with the rocker in any position of tilting.

In order to normally produce brake action between the bumps 22 and the conical surface 9 of the reel 16, a coiled spring 24 is provided around the spindle 23. One end of the spring is held fast to the cross rod 21, while the other end is bent in the axial direction of the spindle in order to engage in one of the slots 8 in the edge of a bushing or short sleeve 25 which fits around the spindle 23 adjacent one side of the rocker 18. A set screw 26 secures the bushing firmly to the spindle 23. By means of a suitable tool engaging in one of the slots 8 of the bushing 25, the latter may be reset and again secured by the set screw 26 in order to tighten or loosen the spring 24 so as to adjust the tension required on the line 16.

In Fig. 2 are indicated the two extreme rocking positions of the rocker 18, namely, the braking position in full lines, when there is only a slight pull or none at all on the line; and the released position of the brake with the brake bump 22 lifted from the conical surface 9 of the spool or reel 12. This occurs when there is a pull on the line 16 either from a fish or the weight of the lead. The line running over the brake pin 27 exerts a pressure thereon so that rocker 18 is tilted forward. Directly the line 16 is slackened, the spring 24 turns the rocker back into its braking position. If, when the line 16 is tensioned, it is desired to temporarily apply the brake, in order to moderate or stop the running out of the line 16, a pressure on the rear cross rod 21 by the operator's finger, will accomplish this. Sometimes, when it is desired to play the fish, the operator alternately presses down and releases the rod 21 at the rear end of the rocker, so that the rocker tilts rearward or forward and tightens and slackens the pull on the line.

While in Figs. 1 to 4 is illustrated a rocker with substantially equal lengths of arms forward and rearward, Fig. 5 on the other hand shows a rocker with unequal arms. By making the forward arms 30 of greater length than the rearward arms 31, the rocker becomes more sensitive to a light pull on the line 16. The rocker is as before mounted to rock on a spindle 23 around which a spring 33 is coiled having one end fastened to the cross rod 34 between the rear arms 31 while the other end is adjustably secured to the spindle 23 as already described, by means of a bushing 25. On the lower side of the arms 31 are provided projections or bumps 32 bevelled on the outer surfaces adapted to contact with the conical surfaces 9 on the inside of the flanges of the reel 12 in order to set up braking action when the rear arms 31 are pressed down by the spring 33.

The ends of the forward arms 30 are held together by the cross rod 36 and spaced therefrom is a pin 35 connecting the arms 30 and also forming stops against the peripheries of the disks 10 and 11 when the rear end with the bumps 32 is lifted and the forward end of the rocker is depressed from the pull on the line 16 pressing on the cross pin 35.

I claim:

1. In combination with a line reel of a brake attachment therefor, the reel having a rigid frame and a spool with end flanges revolubly mounted on said frame; said attachment comprising a rocker, a spindle secured in said frame parallel to the axis of the spool, the rocker being mounted to oscillate on said spindle, means for normally depressing one end of the rocker in braking contact with said spool and a guide member near the other end of said rocker for supporting the line when running off said spool; said rocker consisting of a pair of levers, cross connection for said levers spacing the levers apart correspondingly to the width between end flanges of said spool, and coacting sloping elements on said flanges and the levers respectively at the braking end of the rocker; said depressing means consisting of a spring coiled around said spindle, one end of the spring secured to the rocker and the other end of the spring having adjustable connection with said spindle for regulating the spring resistance, said adjustable spring connection consisting of a bushing revolubly mounted on said spindle and provided with a plurality of notches for receiving said other end of the spring, and a set screw to firmly secure the bushing in adjusted position on said spindle.

2. In combination with a line reel of a brake attachment therefor, the reel having a rigid frame and a spool with end flanges revolubly mounted on said frame; said attachment comprising a rocker, a spindle secured in said frame parallel to the axis of the spool, the rocker being mounted to oscillate on said spindle, means for normally depressing one end of the rocker in braking contact with said spool and a guide member near the other end of said rocker for supporting the line when running off said spool; said rocker consisting of a pair of levers, cross connection for said levers spacing the levers apart correspondingly to the width between end flanges of said spool, and coacting sloping elements on said flanges and the levers respectively at the braking end of the rocker; said depressing means consisting of a spring coiled around said spindle, one end of the spring secured to the rocker and the other end of the spring having adjustable connection with said spindle for regulating the spring resistance, and stops on the rocker adjacent said guide member adapted to limit the tilting of the guide end of the rocker by contacting with said frame when depressed by the line.

3. In combination with a line reel of a brake attachment therefor, the reel having a rigid frame and a spool with end flanges revolubly mounted on said frame; said attachment comprising a rocker, a spindle secured in said frame parallel to the axis of the spool, the rocker being mounted to oscillate on said spindle, means for normally depressing one end of the rocker in braking contact with said spool and a guide member near the other end of said rocker for supporting the line when running off said spool; said rocker consisting of a pair of levers, cross connection for said levers spacing the levers apart correspondingly to the width between end flanges of said spool, and coacting sloping elements on said flanges and the levers respectively at the braking end of the rocker; said depressing means consisting of a spring coiled around said spindle, one end of the spring secured to the rocker and the other end of the spring having adjustable connection with said spindle for regulating the spring resistance, and stops on the rocker adjacent said guide member adapted to limit the tilting of the guide end of the rocker by contacting with said frame when depressed by the line; said adjustable spring connection consisting of a bushing revolubly mounted on said spindle and provided with a plurality of notches for receiving said other end of the spring, and a set screw adapted to firmly secure the bushing in adjusted position on said spindle.

4. In combination with a line reel provided with a frame and a flanged spool revolubly mounted therein, of a brake attachment for said spool comprising a rocker mounted to oscillate on a spindle secured in said frame, permanently fixed brake elements on said rocker, a coiled spring around said spindle, a bushing revolubly mounted on said spindle and provided with a plurality of notches for adjustably engaging one end of said spring, an adjustable securing member for said bushing, the other end of said spring being secured in said rocker in order to cause braking action, and means actuated by a pull on the line to tilt the rocker, thereby counteracting the braking action.

5. In combination with a line reel provided with a frame and a flanged spool revolubly mounted therein, of a brake attachment for said spool comprising a rocker mounted to oscillate on a spindle secured in said frame, permanently fixed brake elements on said rocker, a coiled spring around said spindle, a bushing on said spindle adjustably engaging one end of said spring, a securing member for said bushing, the other end of said spring being secured in said rocker in order to cause braking action and means actuated by a pull on the line to tilt the rocker thereby counteracting the braking action, and side projections on said tilting means forming stops for limiting said tilting.

6. In combination with a line reel provided with a frame, a spool having a flange and revolubly mounted on the frame and a spindle secured in the frame; of a brake attachment for said spool comprising a rocker mounted to oscillate on said spindle, permanently fixed brake elements on said rocker positioned on one side of the spindle, means comprising a coil spring having its ends secured to said spindle and rocker respectively for swinging said elements normally into braking contact with said flange, means inserted between said spindle and spring for adjusting its tension, a guide member across the rocker on the opposite side to the brake elements, whereby the line is adapted to tilt the rocker by a pull exerted on the line to release the braking contact, and an extension on said guide member forming a stop limiting such tilting by contacting with said flange.

7. In combination with a line reel provided with a frame, a spool having a flange and revolubly mounted on the frame and a spindle secured in the frame; of a brake attachment for said spool comprising a rocker mounted to oscillate on said spindle, a permanently fixed brake element on said rocker positioned on one side of the spindle, a coil spring having one end secured to said rocker, a bushing revolubly mounted on said spindle and adapted to engage the other end of the coil spring, an adjustable securing member between said bushing and said spindle, and an actuating member on the rocker on the same side of the spindle as said brake element; whereby, upon pressure being applied to said actuating member, said brake element will be made to contact against said spool flange to stop the unreeling of the line.

LOUIS A. HARRIS.